United States Patent
Li et al.

(10) Patent No.: US 11,775,778 B2
(45) Date of Patent: Oct. 3, 2023

(54) MACHINE TRANSLATION OF ENTITIES

(71) Applicant: Microsoft Technology Licensing, LLC, Redmond, WA (US)

(72) Inventors: Zhuliu Li, Minnetonka, MN (US); Xiao Yan, Sunnyvale, CA (US); Yiming Wang, Fremont, CA (US); Jaewon Yang, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 17/090,776

(22) Filed: Nov. 5, 2020

(65) Prior Publication Data

US 2022/0138440 A1    May 5, 2022

(51) Int. Cl.
*G06F 40/00* (2020.01)
*G06F 40/58* (2020.01)
*G06N 3/08* (2023.01)
*G06N 3/04* (2023.01)
*G06F 40/295* (2020.01)

(52) U.S. Cl.
CPC .......... *G06F 40/58* (2020.01); *G06F 40/295* (2020.01); *G06N 3/04* (2013.01); *G06N 3/08* (2013.01)

(58) Field of Classification Search
CPC ........ G06F 40/58; G06F 40/295; G06F 40/44; G06F 40/247; G06F 16/953; G06N 3/04; G06N 3/08
See application file for complete search history.

(56) References Cited

U.S. PATENT DOCUMENTS 10,445,431 B1 *  10/2019  Lev-Tov ............... G06F 16/532
2018/0039696 A1 *  2/2018  Zhai ........................ G06F 16/35

OTHER PUBLICATIONS

Wang, Z., Lv, Q., Lan, X. and Zhang, Y. Cross-lingual knowledge graph alignment via graph convolutional networks. 2018. In Proceedings of the 2018 conference on empirical methods in natural language processing (pp. 349-357). (Year: 2018).*
Bastings, J., Titov, I., Aziz, W., Marcheggiani, D. and Sima'an, K. Graph convolutional encoders for syntax-aware neural machine translation. 2017. arXiv preprint arXiv:1704.04675. (Year: 2017).*
Sil, A., Kundu, G., Florian, R. and Hamza, W., April. Neural cross-lingual entity linking. 2018, In Thirty-Second AAAI Conference on Artificial Intelligence. (Year: 2018).*
Marcheggiani, D., Bastings, J. and Titov, I., Exploiting semantics in neural machine translation with graph convolutional networks. 2018. arXiv preprint arXiv:1804.08313. (Year: 2018).*

(Continued)

*Primary Examiner* — Douglas Godbold
*Assistant Examiner* — Parker Mayfield
(74) *Attorney, Agent, or Firm* — NICHOLSON DE VOS WEBSTER & ELLIOTT LLP

(57) ABSTRACT

Embodiments of the disclosed technologies incorporate taxonomy information into a cross-lingual entity graph and input the taxonomy-informed cross-lingual entity graph into a graph neural network. The graph neural network computes semantic alignment scores for node pairs. The semantic alignment scores are used to determine whether a node pair represents a valid machine translation.

20 Claims, 9 Drawing Sheets

(56) References Cited

OTHER PUBLICATIONS

Zhou, J., Cui, G., Hu, S., Zhang, Z., Yang, C., Liu, Z., Wang, L., Li, C. and Sun, M., Graph Neural Networks: A Review of Methods and Applications. 2018. arXiv e-prints, pp. arXiv-1812. (Year: 2018).*
Lin, X., Yang, H., Wu, J., Zhou, C. and Wang, B., Guiding cross-lingual entity alignment via adversarial knowledge embedding. Nov. 2019. In 2019 IEEE International Conference on Data Mining (ICDM) (pp. 429-438). IEEE. (Year: 2019).*
Zhu, H., Xie, R., Liu, Z. and Sun, M., Iterative entity alignment via knowledge embeddings. 2017. In Proceedings of the International Joint Conference on Artificial Intelligence (IJCAI). (Year: 2017).*
Hoffart, J., Yosef, M.A., Bordino, I., Fürstenau, H., Pinkal, M., Spaniol, M., Taneva, B., Thater, S. and Weikum, G., Robust disambiguation of named entities in text. Jul. 2011. In Proceedings of the 2011 conference on empirical methods in natural language processing (pp. 782-792). (Year: 2011).*
Zhang F, Liu X, Tang J, Dong Y, Yao P, Zhang J, Gu X, Wang Y, Shao B, Li R, Wang K. Oag: Toward linking large-scale heterogeneous entity graphs. InProceedings of the 25th ACM SIGKDD International Conference on Knowledge Discovery & Data Mining Jul. 25, 2019 (pp. 2585-2595). (Year: 2019).*
Paulheim H. Knowledge graph refinement: A survey of approaches and evaluation methods. Semantic web. Jan. 1, 2017;8(3):489-508. (Year: 2017).*
"Ontology Classes", Retrieved From: https://web.archive.org/web/20200326135356/http://mappings.dbpedia.org/server/ontology/classes/, Mar. 26, 2020, 15 Pages.
"Overview of DGL", Retrieved From: https://docs.dgl.ai/#overview-of-dgl, Oct. 5, 2018, 2 Pages.
"Pytorch", Retrieved From: https://web.archive.org/web/20200701012905/https://pytorch.org/, Jul. 1, 2020, 3 Pages.
Chen, et al., "FASCINATE: Fast Cross-Layer Dependency Inference on Multi-layered Networks", In Proceedings of the 22nd ACM SIGKDD International Conference on Knowledge Discovery and Data Mining, Aug. 13, 2016, 10 Pages.
Kipf, et al., "Semi-Supervised Classification with Graph Convolutional Networks", In Proceedings of 5th International Conference on Learning Representations, Apr. 24, 2017, 14 Pages.
Li, et al., "Scalable Label Propagation for Multi-relational Learning on the Tensor Product of Graphs", In Repository of arXiv:1802.07379v2, May 18, 2020, 17 Pages.
Liu, et al., "Cross-Graph Learning of Multi-Relational Associations", In Repository of arXiv:1605.01832v1, May 6, 2016, 9 Pages.
Schlichtkrull, et al., "Modeling Relational Data with Graph Convolutional Networks", In Repository of arXiv:1703.06103v1, Mar. 17, 2017, 10 Pages.
Sun, et al., "Cross-lingual Entity Alignment via Joint Attribute-Preserving Embedding", In Proceedings of 16th International Semantic Web Conference, Oct. 21, 2017, 16 Pages.
Velickovic, et al., "Graph Attention Networks", In Proceedings of 6th International Conference on Learning Representations, Apr. 30, 2018, 12 Pages.
Wang, et al., "Cross-lingual Knowledge Graph Alignment via Graph Convolutional Networks", In Proceedings of the Conference on Empirical Methods in Natural Language Processing, Oct. 31, 2018, pp. 349-357.
Wang, et al., "dmlc/dgl", Retrieved From: https://github.com/dmlc/dgl/blob/master/examples/pytorch/rgcn/link_predict.py, Jul. 30, 2020, 6 Pages.
Yang, et al., "Aligning Cross-Lingual Entities with Multi-Aspect Information", In Proceedings of the Conference on Empirical Methods in Natural Language Processing and the 9th International Joint Conference on Natural Language Processing, Nov. 3, 2019, pp. 4431-4441.
Zitnik, et al., "Modeling Polypharmacy Side Effects with Graph Convolutional Networks", In Journal of Bioinformatics, vol. 34, Issue 13, Jul. 1, 2018, pp. i457-i466.

* cited by examiner

MACHINE TRANSLATION OF ENTITIES

TECHNICAL FIELD

A technical field to which the present disclosure relates is machine translation of entities using artificial intelligence and natural language processing.

BACKGROUND

Online systems commonly have an information retrieval component. The information retrieval component provides a search interface through which users may input or select search criteria, and a search engine that processes the search criteria, executes the search on stored content, and returns search results that match the search criteria. Web pages, such as user profile pages, job listing pages, company profile pages, and news feed pages, are examples of stored content. To improve the likelihood of relevant content being retrieved in response to a search query, stored content may include structured data. An example of structured data is a canonical entity, such as a "job title" or a "skill."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
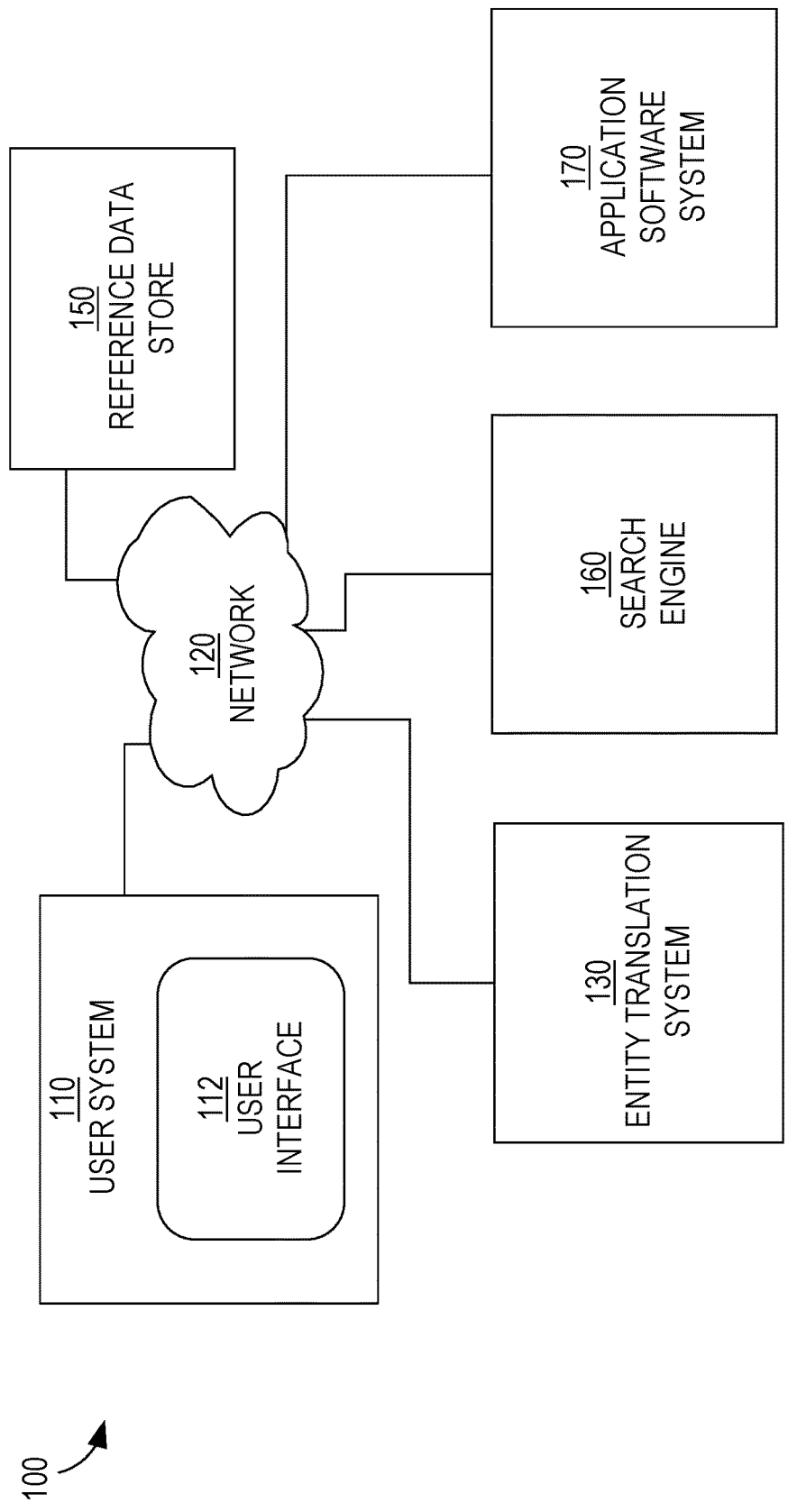
FIG. 1 is a block diagram illustrating at least one embodiment of a computing system in which aspects of the present disclosure may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In multi-lingual systems, there is a need to semantically align natural language data across language boundaries. For example, if an end user is searching for jobs that have a job title of "software engineer," the system should retrieve job records that have a job title that equates semantically to "software engineer" regardless of the native language in which the job records are written. Similarly, if an end user is searching for user profiles that list "machine learning" as a skill, the system should retrieve user profiles that list a skill that corresponds semantically to "machine learning" irrespective of the language in which the user profiles are written.

Additionally, an information retrieval system should correctly align canonical natural language data values across language boundaries. For example, if a user profile data record in a source language has stored the value "software engineer" in the job title field, when the user profile data record is translated to a target language, "software engineer" should be correctly identified as a job title in the target language (and should not be mapped to a "skill" entity, for example.)

As used herein, the term "source language" may be used to refer to the language in which a data value is written prior to a machine translation, and the term "target language" may be used to refer to the language into which the data value is desired to be translated. This disclosure describes examples in which English is the source language and Chinese is the target language; however, the disclosed technologies can be applied to any scenario in which a data value is desired to be machine translated from a source language into a target language or from a target language into a source language.

As used herein, "entity" may refer to a search term that describes an object or item that is typically denoted by a noun, or to an attribute of such an object or item. Entities may be extracted from unstructured text, such as a natural language search query entered into a search input text box of a graphical user interface. Examples of entities include but are not limited to people, organizations, locations, jobs, products. Entities may or may not be denoted by a proper name.

Examples of entity attributes include individual elements of user profile data and job profile data. For instance, entity profile data may include a name of the entity, a job title, a job industry, an academic institution attended, an employment status, a previous employer name, a current employer name, skills, endorsements from other entities, contact information, and address information. Similarly, job profile data may include a job title, an organization name, skills, and locations.

A search engine may use the entities extracted from search queries to retrieve entity data from a database that stores entity data. For example, a software application may represent an entity as a node in a connection graph. Thus, a node may be a software abstraction of entity data. A software implementation of a node need not be tied to any particular hardware or machine and entity data stored by a node may be retrieved by a search engine executing a search query that includes an entity as a search term.

Identifying the correct translation of an entity is a technically challenging task for an online system, because an entity is typically a very short natural language phrase in the range of about, for instance, 1-3 words. Traditional neural machine translation (NMT) methods perform well on longer phrases; for example text sequences that exceed three words in length. This is because the additional words in the text sequence provide semantic context. For example, a complete sentence or a full paragraph often contains several words that are arranged in a particular order according to grammatical, syntactic, or lexical conventions. NMT systems can use the semantic context to improve the accuracy of the machine translation.

However, with shorter phrases, like entities, semantic context is lacking. For example, if a search term entered into a natural language search box is "software engineer," there is no additional context to indicate to the NMT system whether "software engineer" is intended to refer to a job title or to a skill. As another example, if the search term is "copy manager" there is no additional context to indicate to the NMT system whether "copy manager" refers to a job of managing the operation of copy machines or to a job of overseeing and editing creative content. As a result, traditional neural machine translation (NMT) methods have not achieved acceptable translation accuracy for entities.

To address the shortcomings of traditional approaches including NMT approaches, the disclosed technologies formulate the entity translation task as a cross-lingual knowledge graph alignment problem and use a graph neural network model to semantically align cross-lingual knowledge graphs, as described in more detail below.

The disclosed knowledge graph configuration allows semantic context information to be maintained in the graph via heterogenous link types that are obtained from a ground-truth or "reference" taxonomy, which establishes the canonical entities. A taxonomy can be represented as an ontology, which may be implemented as a graph or using a table structure, for example. A taxonomy can be domain-specific or domain-independent. Table 1 below is an example of a domain-specific taxonomy structure shown in table form. An example of a domain-independent taxonomy is DBpedia.

TABLE 1

Example Taxonomy Structure.

| Title | Role | Specialty | Parent Specialty | Occupation | Parent Occupation |
|---|---|---|---|---|---|
| Contractor Game Developer | Engineer | Game Development | Software Engineering | Game Development Engineer | Software Engineer |
| Senior Java Engineer | Engineer | Java | Software Engineering | Java Engineer | Software Engineer |

The first row of Table 1 identifies taxonomy entities that represent either a job title or a skill. For example, "Title," "Role," "Occupation," and "Parent Occupation," are entities that represent a job title while "Specialty" and "Parent Specialty" are entities that represent a skill. The remaining rows illustrate data values that map column-wise to the taxonomy entities in the first row.

In the corresponding taxonomy graph, each entity is represented as a node (such as a title or a skill) and the links (edges) between the nodes represent different types of semantic relationships between the nodes. For instance, using the example of Table 1, six different types of links can be constructed, which represent six different types of semantic relationships between the entities: <title, occupation, title>, <title, specialty, skill>, <title, parent_specialty, skill>, <skill, skill_domain, skill>, <title, role, title>, <title, parent_occupation, title>. In these examples, the link types are, respectively, occupation, specialty, parent_specialty, skill_domain, role, parent_occupation. The "occupation" link type connects a title to another title; the "specialty" link type connects a title to a skill; the "parent_specialty" link type may also connect a title to a skill; the link type skill_domain connects a skill to another skill; the "role" link type connects a title to another title, and the "parent_occupation" link type connects a title to a title.

While the taxonomy graph illustrated by Table 1 may be useful for job search applications, it will be understood by those skilled in the art that the disclosed technologies are not limited to the job search domain. The exact design and configuration of any particular taxonomy graph will depend on the requirements, design, or implementation of a particular system.

Figures 5A, 5B, 5C:
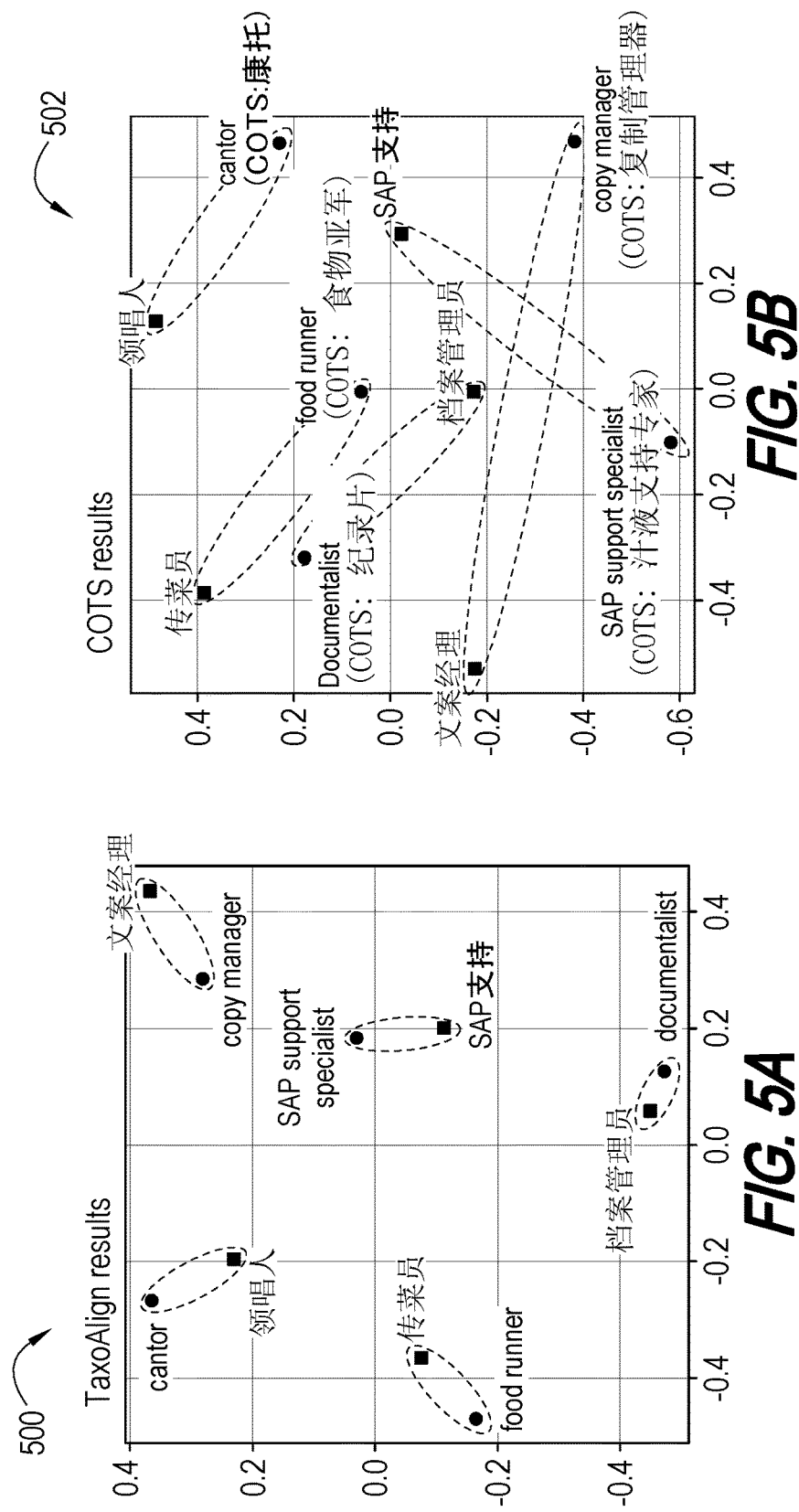
FIG. 5A, FIG. 5B, and FIG. 5C illustrate a comparison of experimental results obtained by an embodiment of the computing system of FIG. 1 to results obtained using a commercial off the shelf machine translation system.

Experiments have shown that the disclosed technologies are capable of, for example, improving the accuracy of entity translations. Experimental data is shown in FIG. 5A, FIG. 5B, and FIG. 5C, described below.

The disclosed technologies can improve cross-lingual entity alignment in connections network-based systems, including but not limited to online networks, such as social networks, application software that interacts with online networks, and other software that provides information retrieval functionality. Examples of application software that may interact with online networks include but are not limited to recruiting applications, online learning software, and job search applications.

As used here, "online" may refer to a particular characteristic of a connections network-based system. For example, many connections network-based systems are accessible to users via a connection to a public network, such as the Internet. However, certain operations may be performed while an "online" system is in an offline state. As such, reference to a system as an "online" system does not imply that such a system is always online or that the system needs to be online in order for the disclosed technologies to be operable.

Example Computing System

FIG. 1 illustrates a computing system in which embodiments of the features described in this document can be implemented. In the embodiment of FIG. 1, computing system 100 includes a user system 110, an entity translation system 130, a reference data store 150, a search engine 160, and an application software system 170.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 may be or include front-end portions of entity translation system 130, search engine 160, and/or application software system 170.

User interface 112 is any type of user interface as described above. User interface 112 may be used to view or otherwise perceive navigation elements produced by entity translation system 130. For example, user interface 112 may include a graphical user interface alone or in combination with an asynchronous messaging interface, which may be text-based or include a conversational voice/speech interface. User interface 112 may make portions of search queries available for processing by entity translation system 130 via a front-end component of search engine 160 and/or application software system 170.

A search query can be created and stored in computer memory as a result of a user operating a front end portion of search engine 160 or application software system 170 via user interface 112. Search engine 160 is configured to process and execute search queries on stored content and return search results in response to the search queries. Search engine 160 is capable of processing and executing search queries that include natural language text alone or in combination with structured query terms such as filters and/or pre-defined sort criteria. Search engine 160 may be a general purpose search engine or a specific purpose search engine, and may be part of or accessed by or through another system, such as application software system 170.

Application software system 170 is any type of application software system. Examples of application software system 170 include but are not limited to connections network software and systems that may or may not be based on connections network software, such as job search software, recruiter search software, sales assistance software, advertising software, learning and education software, or any combination of any of the foregoing.

While not specifically shown, it should be understood that any of entity translation system 130, search engine 160 and application software system 170 includes an interface embodied as computer programming code stored in computer memory that when executed causes a computing device to enable bidirectional communication between application software system 170 and/or search engine 160 and entity translation system 130. For example, a front end of application software system 170 or search engine 160 may include an interactive element that when selected causes the interface to make a data communication connection between application software system 170 or search engine 160, as the case may be, and entity translation system 130. For example, a detection of user input, or a detection of a user selection of a computer-generated re-formulated search candidate, in a front end of application software system 170 or search engine 160, may initiate data communication with entity translation system 130 using, for example, an application program interface (API).

Entity translation system 130 performs machine translation of entities using a taxonomy and a graph neural network-based model as described herein. Entity translation system 130 can operate in a real-time processing mode to, for example, perform entity translation on entities contained in search queries. Alternatively or in addition, entity translation system 130 can operate in a bulk or offline processing mode in which cross-lingual entity translations are performed iteratively on large numbers of content records (such as job records or user profile records) to, for example, create or update a version of the content records in a new target language or to create or maintain a cross-lingual entity alignment graph that can be accessed on-demand. Output produced by entity translation system 130 may be provided to search engine 160 and/or to application software system 170 and/or displayed by user interface 112 and/or stored in reference data store 150, for example.

Reference data store 150 includes at least one digital data store that stores data sets used to train, test, use, and tune graph neural network models that form portions of entity translation system 130 or are otherwise used to operate entity translation system 130. Examples of data that may be stored in reference data store 150 include but are not limited to entity data, taxonomy data, model training data such as semantic embeddings, ground-truth annotations, model parameter values, hyperparameter values, and weight values. Stored data of reference data store 150 may reside on at least one persistent and/or volatile storage device that may reside within the same local network as at least one other device of computing system 100 and/or in a network that is remote relative to at least one other device of computing system 100. Thus, although depicted as being included in computing system 100, portions of reference data store 150 may be part of computing system 100 or accessed by computing system 100 over a network, such as network 120.

A client portion of entity translation system 130, search engine 160 or application software system 170 may operate in user system 110, for example as a plugin or widget in a graphical user interface of a software application or as a web browser executing user interface 112. In an embodiment, a web browser may transmit an HTTP request over a network (e.g., the Internet) in response to user input (e.g., entering of a text sequence) that is received through a user interface provided by the web application and displayed through the web browser. A server portion of entity translation system 130 and/or search engine 160 may receive the input, perform at least one operation to analyze the input, and return at least one modified version of the input using an HTTP response that the web browser receives and processes.

Each of user system 110, entity translation system 130, search engine 160 and application software system 170 is implemented using at least one computing device that is communicatively coupled to electronic communications network 120. Entity translation system 130 is bidirectionally communicatively coupled to user system 110, entity translation system 130, search engine 160 and application software system 170, by network 120. A different user system (not shown) may be bidirectionally communicatively coupled to application software system 170. A typical user of user system 110 may be an end user of application software system 170. User system 110 is configured to communicate bidirectionally with at least entity translation system 130, for example over network 120. Examples of communicative coupling mechanisms include network interfaces, inter-process communication (IPC) interfaces and application program interfaces (APIs).

The features and functionality of user system 110, entity translation system 130, reference data store 150, search engine 160, and application software system 170 are implemented using computer software, hardware, or software and hardware, and may include combinations of automated functionality, data structures, and digital data, which are represented schematically in the figures. User system 110, entity translation system 130, reference data store 150, search engine 160, and application software system 170 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

Network 120 may be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Terms such as "computer-generated" and "computer-selected" as used herein may refer to a result of an execution of one or more computer program instructions by one or more processors of, for example, a server computer, a network of server computers, a client computer, or a combination of a client computer and a server computer.

It should be understood that computing system 100 is just one example of an implementation of the technologies disclosed herein. While the description may refer to FIG. 1 or to "system 100" for ease of discussion, other suitable configurations of hardware and software components may be used to implement the disclosed technologies. Likewise, the particular embodiments shown in the subsequent drawings and described below are provided only as examples, and this disclosure is not limited to these exemplary embodiments.

Example Entity Translation System

Figure 2A:
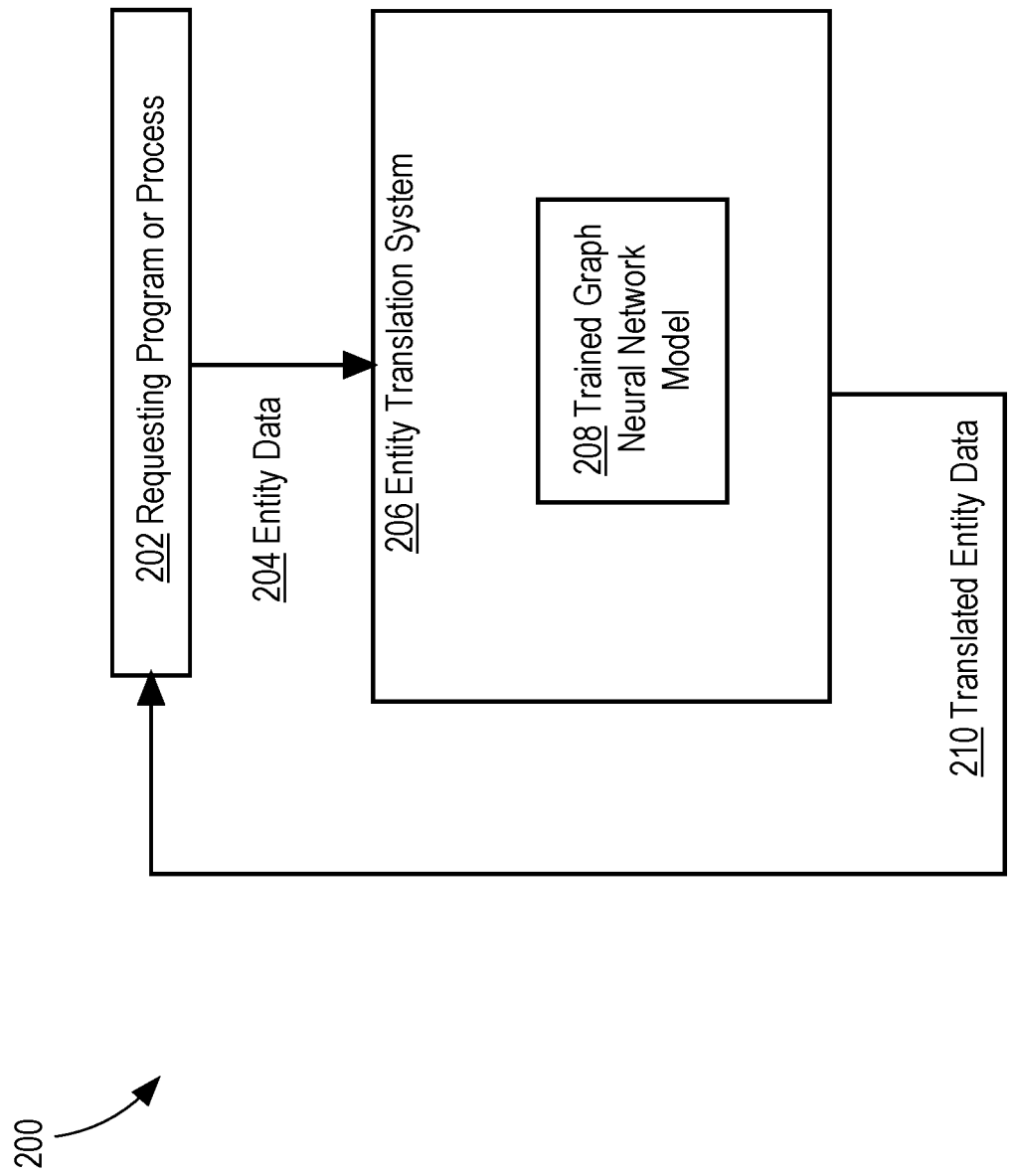
FIG. 2A is a flow diagram of a process that may be used to implement a portion of the computing system of FIG. 1.

FIG. 2A is a schematic diagram of an arrangement of software-based components and a flow 200 for an embodiment of computing system 100, including examples of flows between components including inputs and outputs.

In FIG. 2A, a requesting program or process 202 sends or otherwise provides entity data 204 to entity translation system 206. Requesting program or process 202 may be a portion of user interface 112, which receives computer-based interactions of an end user with, for example, a front end of search engine 160 or application software system 170. Alternatively or in addition, requesting program or process 202 may include a back-end process that iteratively ingests content records, such as user profiles or job records, and extracts entities from those data records for machine translation by entity translation system 206.

In a real time processing use case, entity data 204 includes, for example, a source entity and at least one target entity. In an offline or bulk processing use case, entity data 204 includes a plurality of source entity-target entity pairs.

Figure 2B:
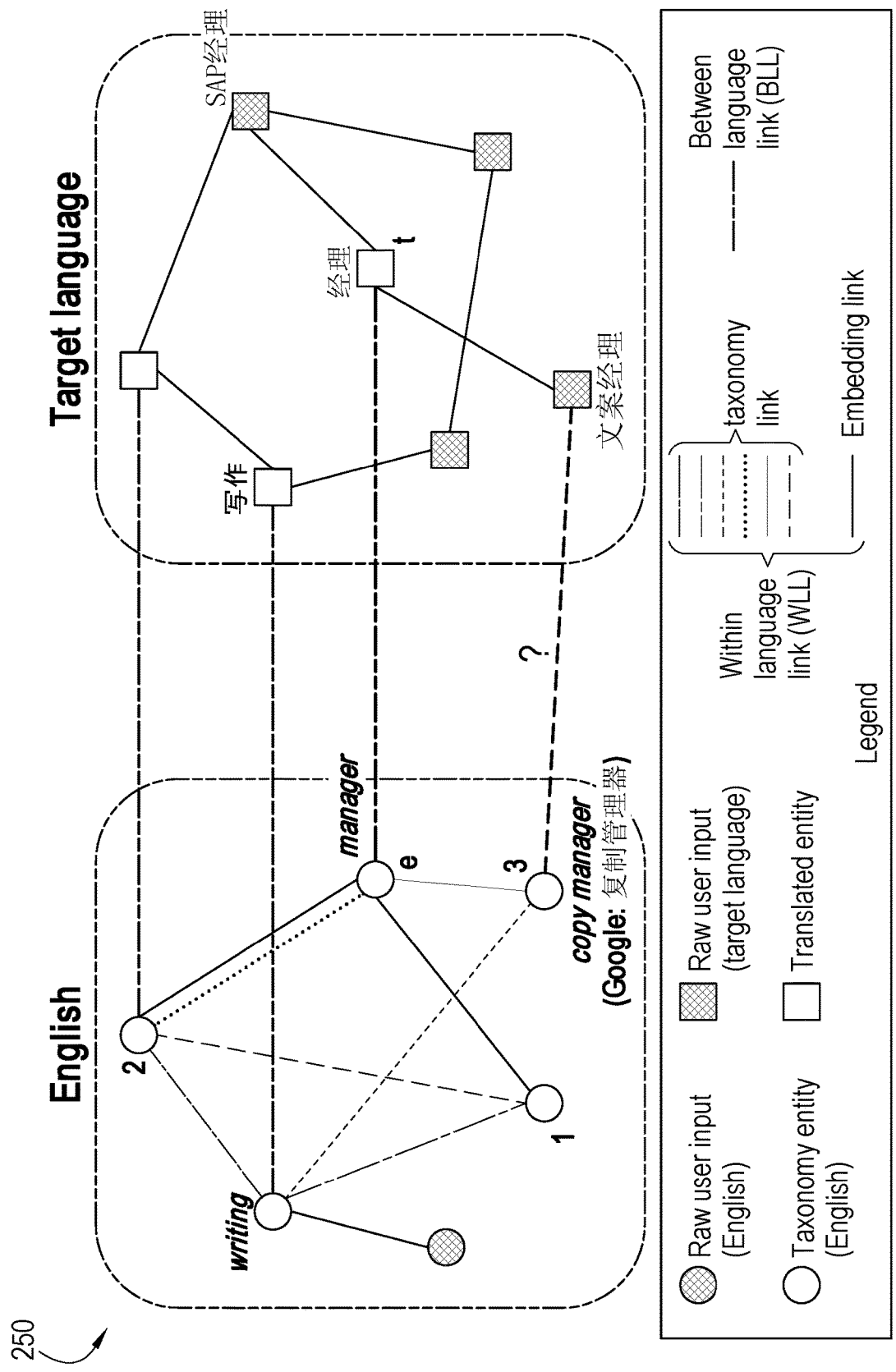
FIG. 2B is a schematic diagram of a cross-lingual taxonomy graph that may be used to implement a portion of the computing system of FIG. 1.

Entity data 204 may include a portion of a cross-lingual graph that includes at least one source entity, at least one target entity and at least one taxonomy link. An example of a cross-lingual graph that includes source entities, target entities, and taxonomy links is shown in FIG. 2B, described below. Entity data 204 may include semantic embeddings for source entities and/or target entities, or semantic embeddings may be computed by, for example, an embedding layer of trained graph neural network model 208. Embedding processes for source entities and target entities are described below with reference to FIG. 3A.

Figure 2C:
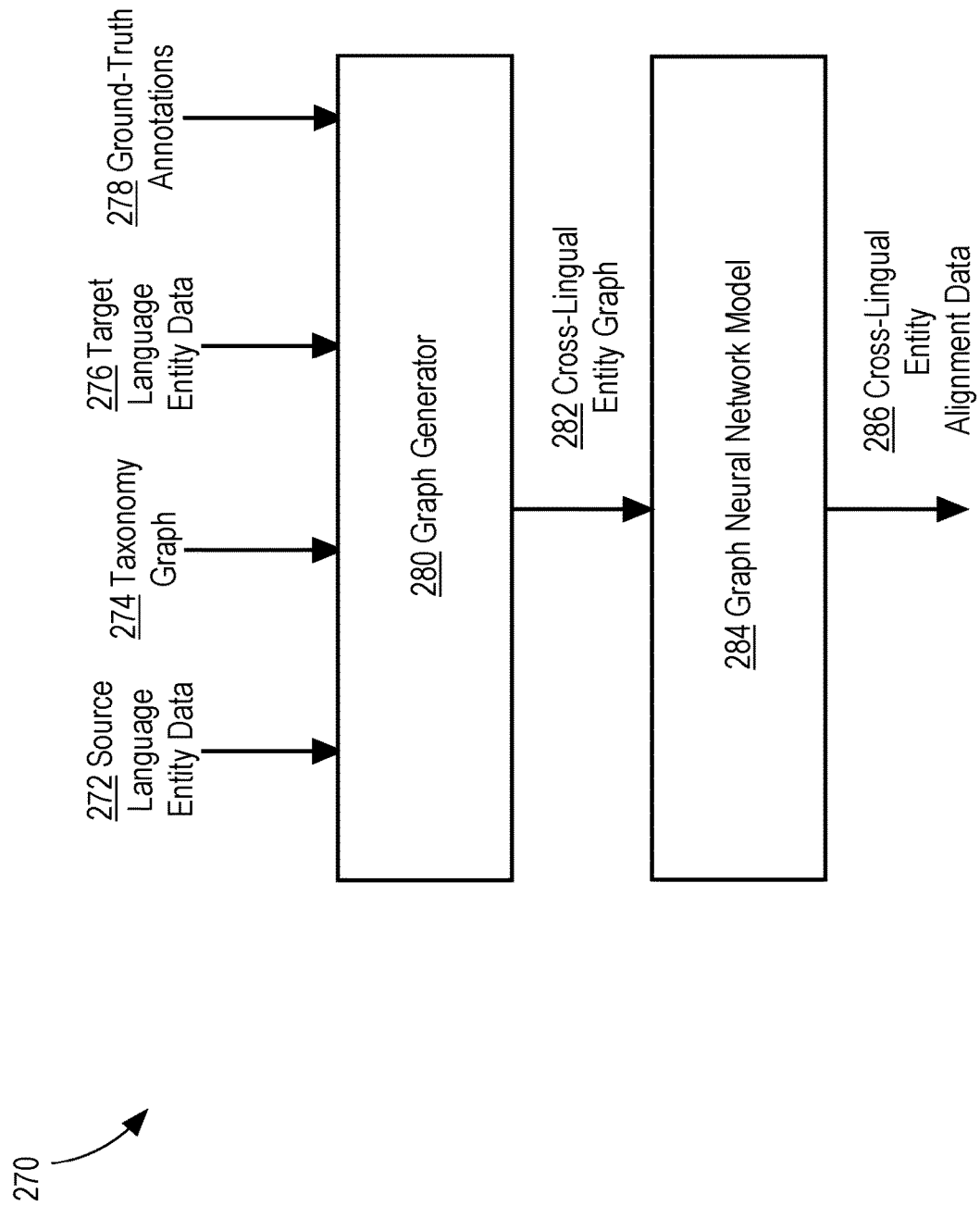
FIG. 2C is a flow diagram of a process that may be used to implement a portion of the computing system of FIG. 1.
Figure 3A:
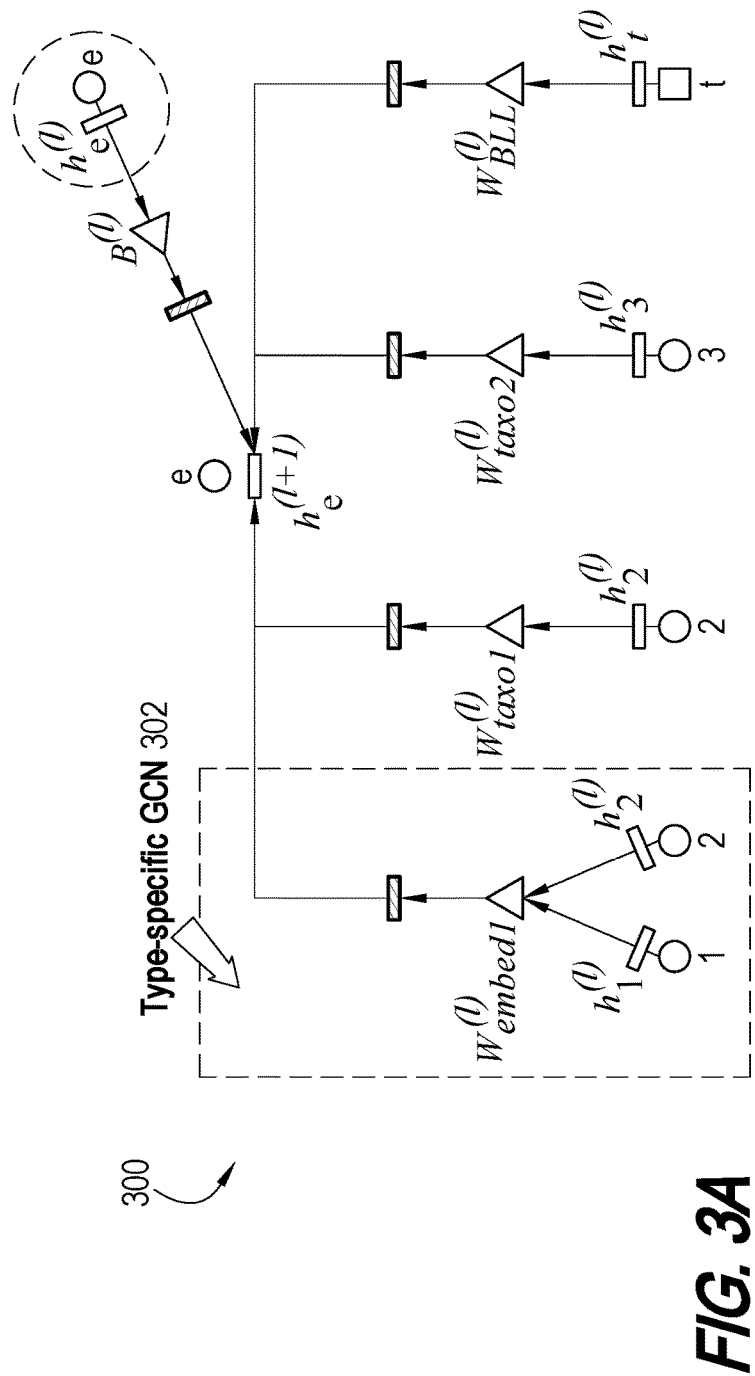
FIG. 3A and FIG. 3B are schematic diagrams of portions of a graph neural network that may be used to implement a portion of the computing system of FIG. 1.
Figure 3B:
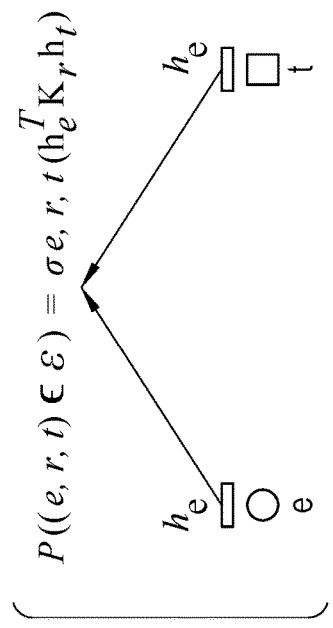

Entity translation system 206 inputs entity data 204 into trained graph neural network model 208. An example of a graph neural network model configuration that may be used as graph neural network model 208 is shown in FIG. 3A and FIG. 3B, described below. A process for creating a cross-lingual entity graph with taxonomy links and training a graph neural network model, which may be used to create graph neural network model 208, is shown in FIG. 2C, described below. Trained graph neural network model 208 outputs translated entity data 210 in response to the input of entity data 204. Translated entity data 210 includes, for example, at least one source entity-target entity pair and alignment scores produced by the trained graph neural network model 208 for each of the at least one source entity-target entity pair.

Either entity translation system 206 or requesting program or process 202 may select a source entity-target entity pair based on the alignment scores. For example, either system 206 or program or process 202 may sort the at least one source entity-target entity pair by alignment score and select the source entity-target entity pair with the highest alignment score. Alternatively, either system 206 or program or process 202 may compare alignment scores to a threshold value and select a source entity-target entity pair that meets or exceeds the threshold value, where the threshold value is defined based on the requirements of the particular design or implementation of the system 100.

Example Cross-Lingual Entity Graph with Taxonomy Links

FIG. 2B is a schematic diagram of a cross-lingual entity graph 250 of computing system 100, which may be stored on at least one device of the computing system of FIG. 1 and may be used to determine semantic alignments between entities.

In FIG. 2B, there are four different types of nodes: nodes that represent raw user input in the source language (here, English), taxonomy entities in the source language, nodes that represent raw user input in the target language, and translated entities. Examples of nodes that represent raw user input, either in the source language or the target language, are entities that have been extracted from data records, such as user profiles and job records, in the source or target language as the case may be, and entities that have been extracted from search queries, in the source or target language, as the case may be.

Examples of taxonomy entities are entities that have been obtained from the reference taxonomy, for example, during a training phase. Examples of translated entities are entities that have been labeled with ground-truth annotations as valid translations of the entity with which they are linked via between language links (BLLs), during a training phase.

Translated entities also include entities that have been labeled as valid translations of the entities with which they have been connected via BLLs by a graph neural network model, e.g., trained graph neural network model 208, in a previous machine translation iteration, during an operational phase (post-training).

In FIG. 2B, there are three main types of links: embedding links, taxonomy links, and BLLs. Embedding links are links that represent pure semantic similarity of the connected nodes. Embedding links may be established by, for example, performing a traditional semantic similarity computation such as cosine similarity between nodes of a node pair within the same language. Thus, a previously unseen raw user input is connected to at least one other node in the portion of the graph that is of the same language as the previously unseen raw user input based on semantic similarity.

Taxonomy links are established only in the portion of the graph that contains raw user input nodes of the same language. Thus, in FIG. 2B, taxonomy nodes and taxonomy links are merged with the source language semantic graph since both the taxonomy graph and the source language semantic graph are in English. As such, the taxonomy links are considered to be within language links (WLLs). Although FIG. 2B does not show any taxonomy links on the target language portion of the graph, there could be taxonomy nodes and links on the target language portion of the graph if, for example, the taxonomy were created in the target language instead of the source language.

As illustrated in FIG. 2B, the taxonomy links themselves are heterogenous. That is, within the set of taxonomy links, there are different types of taxonomy links. Examples of different types of taxonomy links are shown in Table 1, described above. As noted earlier, the availability of different taxonomy link types allows the graph to represent semantic context even though the entities themselves do not provide semantic context.

In the example of FIG. 2B, nodes 1, 2, 3, e, and "writing," and all of the taxonomy links, are provided by the reference taxonomy. An initial, training set of BLLs are provided by ground-truth training data. In the illustration, the system has received entity 3, "copy manager." The dashed line labeled "?" connecting the taxonomy entity 3, "copy manager" and the linked raw user input in the target language on the other end of the "?" dashed line identifies an entity pair between which a BLL does not yet exist and the system is to determine whether or not to establish a BLL. To determine a valid translation of "copy manager" into the target language (here, Chinese), the taxonomy links are especially useful because they connect "copy manager" to node e, "manager" by a first type of taxonomy link and to the "writing" node by a second, different type of taxonomy link.

The different types of taxonomy links connecting the nodes provide semantic context. For example, the taxonomy link between the "writing" node and node 1 indicates a particular type of semantic relationship between those two nodes. The fact that a different type of taxonomy link connects the "writing" node to node 3 indicates that the type of semantic relationship between the "writing" node and node 3 is different than the type of semantic relationship between the "writing" node and node 1.

The BLLs establish valid translations of "writing," "manager," and node 2 into the target language (e.g., through model training or prior iterations of operational use). The valid translations of "writing," "manager," and node 2 are accessible to the machine translation process for "copy manager" by virtue of the taxonomy links. As a result, the system is able to arrive at a valid translation for "copy manager" that retains the semantic context provided by the taxonomy links. In this example, the availability of the semantic context provided by the disclosed technologies resulted in a correct translation of "copy manager" into Chinese as a job title. Without the benefit of the semantic context provided by the taxonomy links, a prior commercial off-the-shelf (COTS) system that did not have access to the semantic context incorrectly translated "copy manager" to the Chinese equivalent of "copy machine" (e.g., to a different semantic type, "machine" instead of "job title").

Example of Model Training

FIG. 2C is a schematic diagram of an arrangement of software-based components and a flow 270 for an embodiment of computing system 100, including examples of flows between components including inputs and outputs.

In FIG. 2C, a graph generator 280 is configured to, when executed by at least one processor, cause one or more computing devices to create a cross-lingual entity graph 282, such as graph 250 of FIG. 2B, described above. Graph generator 280 takes as input source language entity data 272, taxonomy graph 274, target language entity data 276, and ground-truth annotations 278.

An example of source language entity data 272 is raw user input, such as entities extracted from a search query or a data record, such as a user profile or a job data record, in a source language (e.g., English). Examples of taxonomy graph 274 are the reference taxonomy structure described and shown in Table 1, above, and the illustration of the reference taxonomy nodes and links in graph 250 of FIG. 2B. An example of target language entity data 276 is raw user input, such as entities extracted from a search query or a data record, such as a user profile or a job data record, in a target language (e.g., Chinese). An example of ground-truth annotations 278 are between language links such as the BLLs shown in FIG. 2B.

Graph generator 280 creates within-language embedding links between entities within the source language and also performs a similar process to create within-language embedding links between entities within the target language. Graph generator 280 then merges taxonomy graph 274 with source language entity data 272. As a result of merging taxonomy graph 274 with source language entity data 272, some nodes in the merged graph may be connected by both an embedding link and a taxonomy link of a particular link type. Taxonomy nodes are not generally connected by multiple different types of taxonomy links. That is, as between taxonomy nodes, there is generally at most one taxonomy link of a particular type.

Graph generator 280 uses ground-truth annotations 278 to connect taxonomy nodes in the merged source language graph to entities in the target language entity data 276. Graph generator 280 outputs the merged source language graph connected to the target language entity data 276 as cross-lingual entity graph 282. Using the taxonomy graph 274 to connect the source entity data to the target entity data allows semantic context information to flow across the language boundary.

Graph neural network model 284 takes as input training data including cross-lingual entity graph 282 and produces and outputs cross-lingual entity alignment data 286. Examples of cross-lingual entity alignment data 286 include source entity-target entity pairs and corresponding alignment scores, where an alignment score is a numerical value, such as a probabilistic value between 0 and 1, inclusive, which indicates the extent to which the source entity and the target entity in the entity pair are semantically aligned. For instance, a high score or a probabilistic value of 1 may indicate a high degree of semantic alignment while a low score or a probabilistic value of 0 may indicate a low degree of semantic alignment.

High semantic alignment is an indicator of a valid machine translation. Thus, if a particular source entity-target entity pair has a high alignment score, cross-lingual entity alignment data 286 may indicate a valid translation. Conversely, if a particular source entity-target entity pair has a low alignment score, cross-lingual entity alignment data 286 may indicate an invalid or inaccurate translation. When a source entity-target entity pair is a valid translation, cross-lingual entity alignment data 286 may be fed back to graph generator 280. In response to receiving cross-lingual entity alignment data 286 that indicates a valid translation, graph generator 280 may create a link between the source entity and the target entity of the source entity-target entity pair.

The disclosed technologies can be used to create within language links (WLLs) alternatively or in addition to the creation of BLLs. That is, graph neural network model 284 may generate semantic alignment data for source entity-source entity pairs or for target entity-target entity pairs, as well as for source entity-target entity pairs, using a similar process. For instance, to create WLLs, graph neural network model 284 would be trained using the reference WLLs provided as part of taxonomy graph 274. Similarly, to create embedding links between target entities, graph neural network model 284 would be trained using embeddings provided as part of target language entity data 276 or obtained via an embedding layer of graph neural network model 284.

Once created, cross-lingual entity graph 282 can be stored in computer memory as, for example, a searchable database, and used for on-demand or batch lookups of entity and/or link information. Once trained, database graph neural network model 284 can be used to update the cross-lingual entity graph 282 by adding and/or changing entities, links, and/or link types in graph 282 over time.

Example Graph Neural Network

FIG. 3A and FIG. 3B are schematic diagrams of portions of a graph neural network that may be used to implement a portion of the computing system of FIG. 1.

FIG. 3A is an illustration of an encoder portion 300 of a graph neural network model and FIG. 3B illustrates a decoder portion of the same graph neural network model. That is, output of encoder portion 300 is received as input by the decoder portion of FIG. 3B. In an embodiment, the graph neural network of FIG. 3A and FIG. 3B is implemented using a relational graph convolutional network (RGCN) framework. Encoder portion 300 includes a set of type-specific graph convolutional networks (GCNs) 302, each of which is specific to a particular link type (e.g., a particular taxonomy link type).

The type-specific GCNs 302 each propagate semantic alignment information between node pairs which are connected by a specific link type, where a node pair may be a source entity-target entity node pair, a source entity-source entity node pair, or a target entity-target entity node pair. Thus, the number of GCNs 302 used by a particular node pair corresponds to the number of different link types associated with the node pair. The RGCN then combines all of the type-specific GCNs together.

In FIG. 3A, the encoder portion 300 of the RGCN creates an embedding $h_e$ for an entity e. To do this, encoder portion 300 utilizes the cross-lingual entity graph or at least a subset thereof that includes nodes 1, 2, 3 and t, where t is a target node. To generate the hidden representation $h_e^{(l+1)}$ of node $e_i$ in the (l+1)th layer, the RGCN first determines a computation graph with n GCN branches corresponding to the n different link types that connect the nodes 1, 2, 3 and t to e in the cross-lingual entity graph (here, n=4, but n can be any positive integer). Each GCN branch contains one type-specific GCN with a weight matrix $W_r^{(l)}$ propagating the information from e's neighbors through link type γ. The hidden representation $h_e^{(l+1)}$ of node e in the lth layer is also propagated through an additional GCN branch with weight matrix $B^{(l)}$. The hidden representation of a given node i in the (l+1)th layer can be formulated as:

$$h_i^{(l+1)} = \phi\left(B^{(l)}h_i^{(l)} + \sum r \in \mathcal{R} \sum j \in \mathcal{N}_r^i \alpha_r^{ij} W_r^{(l)} h_j^{(l)}\right),$$

where $\phi(\ )$ can be any non-linear activation function, $\mathcal{R}$ denotes the set of link types, $\mathcal{N}_r^i$ denotes the neighbor set of node i under link type γ and $\alpha_r^{ij}$ is a scalar factor reflecting the importance of node j's message to node i under link type γ. In the illustrated embodiment, the scalar factor is chosen uniformly. In other embodiments, the scalar factor can be learnable via an attention mechanism.

The decoder portion of the RGCN, shown in FIG. 3B, computes the alignment score for the node pair. That is, given the embeddings $h_i$ and $h_j$ of a node pair (i, j) in the output layer, the probability of node i and node j being connected by a particular link type γ can be computed as $P((i, r, j) \in \varepsilon) = \sigma(h_i^T K_r h_j)$, where $K_r$ is a diagonal matrix which adds freedoms with respect to link types, σ is the sigmoid function and ε is the link set. In an embodiment, the RGCN model is trained by minimizing the cross-entropy loss function with negative sampling, and the trainable parameters being $W_r^{(l)}$, $B^{(l)}$, and $K_r$.

Prior approaches by Wang et al., "Cross-lingual Knowledge Graph Alignment via Graph Convolutional Networks", (2018) and Yang et al., "Aligning Cross-Lingual Entities with Multi-Aspect Information" (2019) have used two independent GCNs to handle the graphs in the source and target language, respectively, and have only connected the GCNs through the loss function in the final output. The prior approaches of Wang et al. and Yang et al. keep the handling of the source and target language graphs separate, i.e., each of the source language graph and the target language graph is separately and independently input into a different GCN. In contrast, embodiments of the disclosed technologies merge the source language graph and the target language graph using the taxonomy links to establish BLLs between the two graphs before the graphs are input into any GCNs, and then the merged graph is input into a GCN. By connecting the source and target entity graphs via the taxonomy, an embodiment of the disclosed technologies efficiently fuses the semantic information between the source and target languages and does not require the weights of the embedding links to be trained independently in different languages. Rather, using an embodiment of the disclosed technologies, the weights of embedding links can be shared across the language boundary to reduce the number of model parameters.

Additionally, the prior approaches of Wang et al. and Yang et al. have only decoded BLLs. The disclosed technologies, in an embodiment, decode WLLs or both WLLs and BLLs in order to maximize the information usage of the cross-lingual entity graph. Experimental results have demonstrated that the disclosed approach becomes significantly more robust to scarcely annotated BLLs when decoding both WLLs and BLLs together. This allows the disclosed technologies to be utilized effectively even when BLL annotations are scarce, i.e., with small sets of training data. Moreover, in comparison to the prior approaches of Wang et al. and Yang et al., which do not consider the link type during graph construction, the disclosed technologies directly model the link type during graph construction, as a graph with heterogenous link types using RGCN and have been shown to achieve better performance over the prior strategies.

Example Entity Translation Process

Figure 4A:
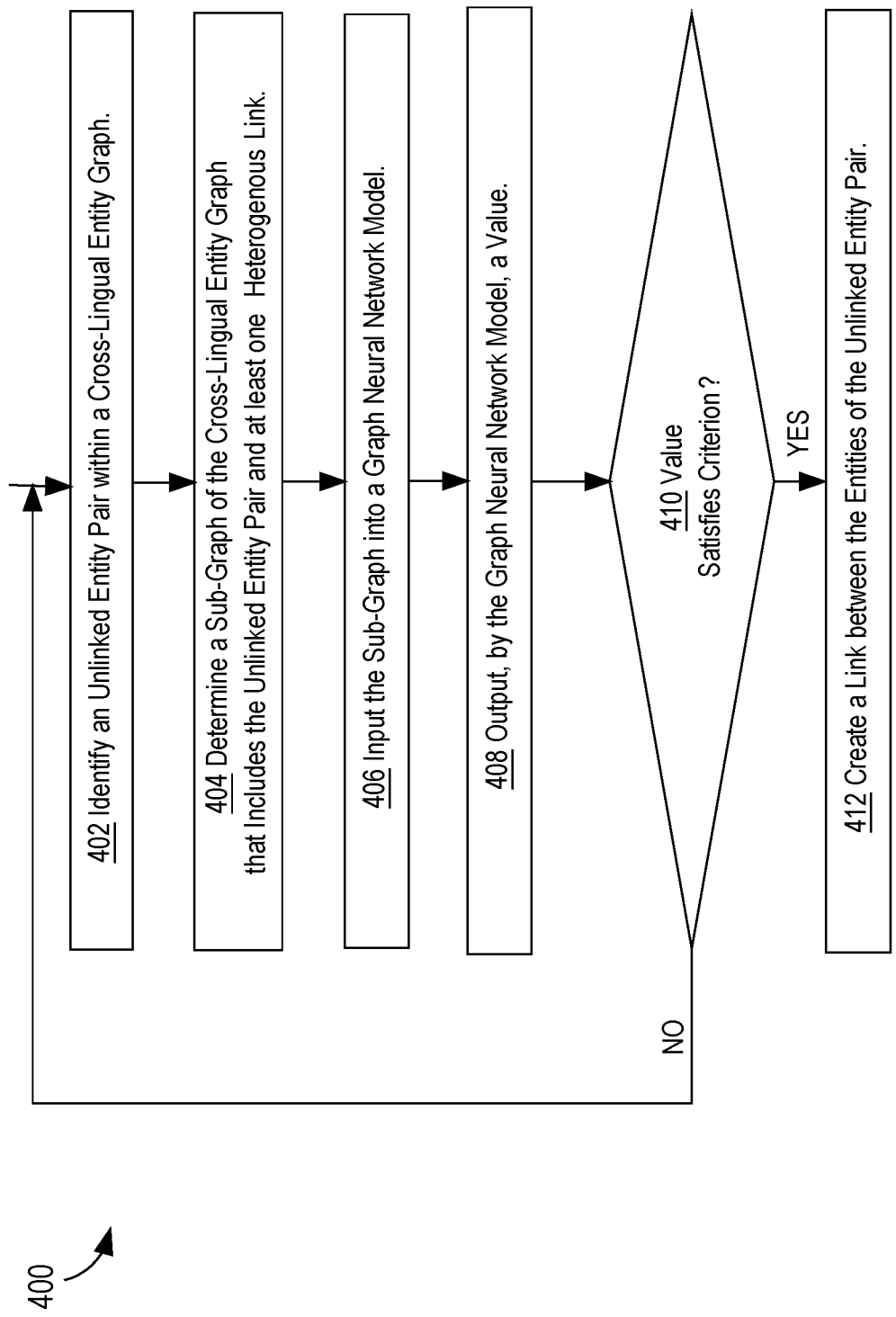
FIG. 4A is a flow diagram of a process that may be executed by at least one device of the computing system of FIG. 1.

FIG. 4A is a simplified flow diagram of an embodiment of operations that can be performed by at least one device of a computing system. The operations of a flow 400 as shown in FIG. 4A can be implemented using processor-executable instructions that are stored in computer memory. For purposes of providing a clear example, the operations of FIG. 4A are described as performed by computing system 100, but other embodiments may use other systems, devices, or implemented techniques.

Operation 402 when executed by at least one processor causes one or more computing devices to identify an unlinked entity pair within a cross-lingual entity graph. Operation 402 can be performed by, for example, an automated process that traverses an existing entity graph looking for unlinked entity pairs. Operation 402 can also be performed on-demand. For example, in response to a search query that specifies an entity value as a search term, operation 402 can create a semantic embedding of the entity value, use the semantic embedding to add the entity value to a cross-lingual entity graph, and then traverse the graph to find another entity in the graph that is not linked to the entity value, to create the unlinked entity pair. Alternatively or in addition, Operation 402 can be performed iteratively to create many unlinked entity pairs for which alignment scores can be computed. For example, operation 402 can be performed periodically, for example as a nightly offline process, to compute new alignment scores and update previously computed alignment scores, for example as new entities are added to the entity graph.

Operation 404 when executed by at least one processor causes one or more computing devices to determine a sub-graph of the cross-lingual entity graph that includes the unlinked entity pair identified by operation 402, and at least one heterogenous link. To do this, operation 404 may traverse neighboring nodes of each of the source entity and the target entity of the unlinked entity pair and read the link metadata to identify at least one heterogenous link. Heterogenous links are links of different link types, such as the taxonomy links that are part of the reference taxonomy used to create the cross-lingual entity graph.

In some embodiments, the sub-graph determined in operation 404 is the entire cross-lingual entity graph, while in other embodiments the sub-graph may be a smaller portion of the entire entity graph. The size of the sub-graph is configurable to accommodate performance constraints and/or other design or implementation considerations.

Operation 406 when executed by at least one processor causes one or more computing devices to input the sub-graph determined by operation 404 into a graph neural network model. Operation 408 when executed by at least one processor causes one or more computing devices to output, by the graph neural network model, a value. An example of a graph neural network model that may be used in operations 406 and operation 408 is described above with reference to FIG. 3A and FIG. 3B. An example of a value that may be output by operation 408 in response to input of the sub-graph into the graph neural network model is an alignment score for an entity pair.

Operation 410, when executed by at least one processor causes one or more computing devices to compare the value output by operation 408 to a criterion. An example of a criterion is a threshold value, such as a confidence score, where the confidence score exceeds 90%. The exact nature of the criterion and configuration of the comparison operation may be determined by the requirements of a particular design or implementation. If the value does not satisfy the criterion, flow 400 ends or returns to operation 402 to process another unlinked entity pair. If the value satisfies the criterion, operation 410 proceeds to operation 412.

Operation 412, when executed by at least one processor causes one or more computing devices to create a link between the entities of the unlinked entity pair identified by operation 402. To do this, operation 412 may, for example, insert a new row into a database table that includes identifiers for the entities of the unlinked pair, a link identifier, and a link type. When the unlinked entity pair contains a source entity and a target entity, the link type may be a BLL. When the unlinked entity pair contains two source entities, the link type may be a particular type of taxonomy link. When the unlinked entity pair contains two target entities, the link type may be an embedding link. After operation 412, flow 400 ends or returns to operation 402 to process another unlinked entity pair.

Example Entity Translation Process

Figure 4B:
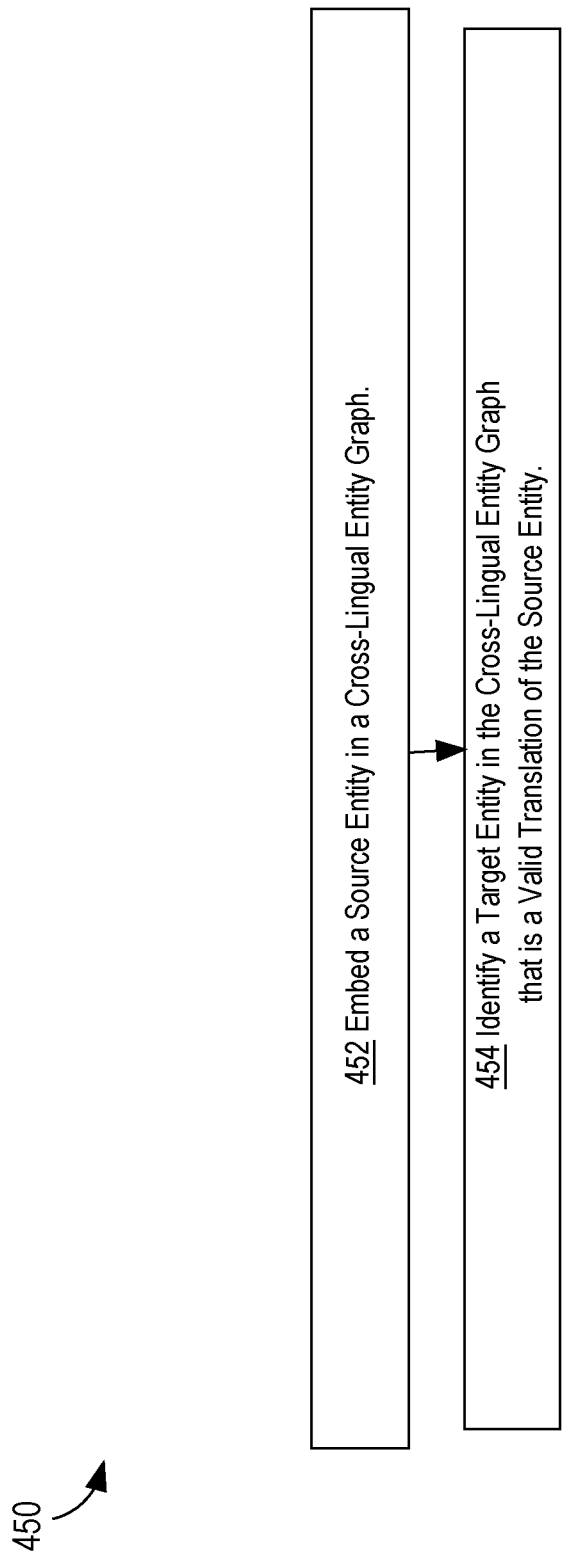
FIG. 4B is a flow diagram of a process that may be executed by at least one device of the computing system of FIG. 1.

FIG. 4B is a simplified flow diagram of an embodiment of operations that can be performed by at least one device of a computing system. The operations of a flow 450 as shown in FIG. 4B can be implemented using processor-executable instructions that are stored in computer memory. For purposes of providing a clear example, the operations of FIG. 4B are described as performed by computing system 100, but other embodiments may use other systems, devices, or implemented techniques.

Operation 452, when executed by at least one processor causes one or more computing devices to embed a source entity in a cross-lingual entity graph. Operation 452 may be performed, using real time processing when, for example, a user inputs an entity value as a search term and the entity value needs to be translated into a target language so that the search can be conducted across multi-lingual data records. To embed the source entity in the cross-lingual entity graph, operation 452 may iteratively compute a cosine similarity between the entity value and other entity values in the source language in the cross-lingual entity graph.

Operation 454, when executed by at least one processor causes one or more computing devices to identify a target entity in the cross-lingual entity graph that is a valid translation of the source entity. To do this, operation 454 may input the cross-lingual entity graph or a subset thereof into a trained neural network model such as the RGCN described above with reference to FIG. 3A and FIG. 3B. The trained neural network model may identify the target entity by, for example, iteratively computing alignment scores between the source entity and a plurality of different possible target entities in the cross-lingual entity graph and then selecting a target entity for which the alignment score satisfies a criterion, such as exceeding a threshold value.

Examples of Experimental Results

FIG. 5A and FIG. 5B illustrate a comparison of experimental results obtained by an embodiment of the computing system of FIG. 1 to results obtained using a commercial off the shelf (COTS) machine translation system, while FIG. 5C provides a legend for interpreting FIG. 5A and FIG. 5B. FIG. 5A shows results obtained using an embodiment of the disclosed technologies and FIG. 5B shows results obtained using the COTS machine translation system.

In one experiment, a cross-lingual entity graph was used that included over 50,000 entities, over 60,000 taxonomy links with more than 5 link types, over 100,000 embedding links, and approximately 25,000 ground truth BLL annotations. For training, ground truth annotations were generated using a commercial off the shelf (COTS) machine translation program. FIG. 5A and FIG. 5B visualize the embeddings of 5 different cross-lingual pairs produced by the disclosed technologies (FIG. 5A) and by the COTS system (FIG. 5B).

The visualizations of FIG. 5A and FIG. 5B were produced by applying a multidimensional scaling (MDS) dimension reduction to the similarity matrix to find the two-dimensional representation of the entities. The similarity matrix of FIG. 5A was obtained by calculating the generalized inner product in the output layer. The similarity matrix of FIG. 5B was computed by measuring the cosine similarity between the word embeddings. The smaller two-dimensional distances between entities of entity pairs in FIG. 5A indicates that the disclosed technologies outperformed the COTS product, most likely due to the availability of semantic context provided through the use of the taxonomy graph as described herein. For example, compare the distance between "food runner" and the Chinese entity produced by the disclosed technologies shown in FIG. 5A to the distance between "food runner" and the Chinese entity produced by the COTS system shown in FIG. 5B. As another example, compare the Chinese translation of "copy manager" produced by the disclosed technologies shown in FIG. 5A to the Chinese translation of "copy manager" produced by the COTS system shown in FIG. 5B.

Example Hardware Architecture

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 6:
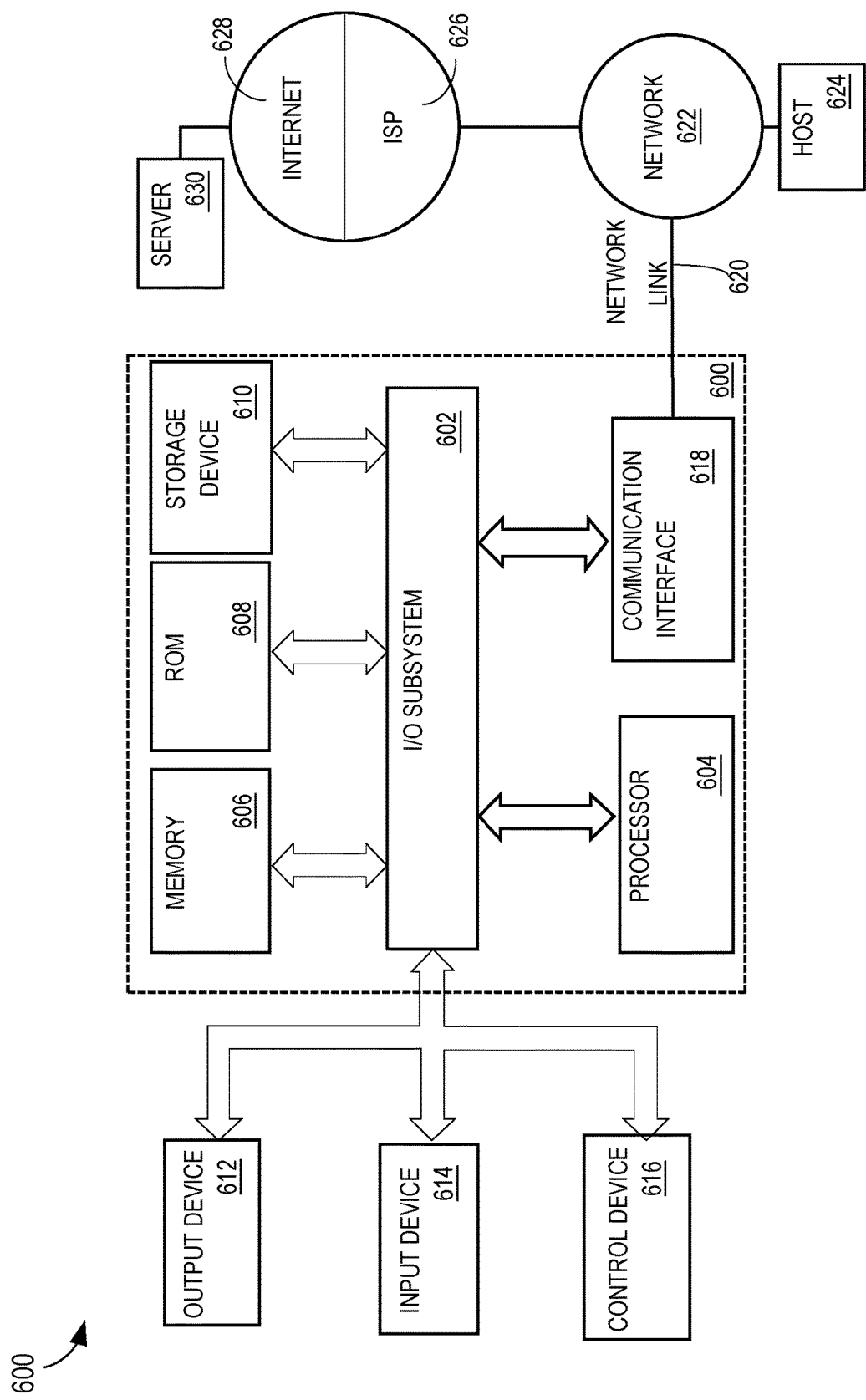
FIG. 6 is a block diagram illustrating an embodiment of a hardware system, which may be used to implement various aspects of the computing system of FIG. 1.

For example, FIG. 6 is a block diagram that illustrates a computer system 600 upon which an embodiment of the present invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 and further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to an output device 612, such as a display, such as a liquid crystal display (LCD) or a touchscreen display, for displaying information to a computer user, or a speaker, a haptic device, or another form of output device. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, at least one ASIC or FPGA, firmware and/or program logic which in combination with the computer system causes or programs computer system 600 to be a special-purpose machine. According to one embodiment, the techniques herein are performed by computer system 600 in response to processor 604 executing at least one sequence of instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying at least one sequence of instruction to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through at least one network to other data devices. For example, network link 620 may provide a connection through local network 622 to a host computer 624 or to data equipment operated by an Internet Service Provider (ISP) 626. ISP 626 in turn provides data communication services through the world-wide packet data communication network commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 530 might transmit a requested code for an application program through Internet 628, ISP 626, local network 622 and communication interface 618. The received code may be executed by processor 604 as it is received, and/or stored in storage device 610, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method for performing machine translation includes identifying an unlinked entity pair within a cross-lingual entity graph; the cross-lingual entity graph including a plurality of source entities, a plurality of target entities, and a plurality of links; at least two of the plurality of links being of different link types; the unlinked entity pair including a source entity of the plurality of source entities and a target entity of the plurality of target entities; determining a sub-graph of the cross-lingual entity graph that includes the unlinked entity pair and at least one link of the plurality of links; inputting the sub-graph into a graph neural network (GNN) that has been trained using different link types; in response to inputting the sub-graph into the GNN, outputting, by the GNN, a value; when the value satisfies a criterion, creating and storing a link between the source entity and the target entity in the cross-lingual entity graph; the link indicating that the target entity is a valid translation of the source entity.

An example 2 includes the subject matter of example 1, further including: inputting the sub-graph into an encoder of the GNN; in response to inputting the sub-graph into the encoder, outputting, by the encoder, a source entity embedding; inputting the source entity embedding and a target entity embedding into a decoder of the GNN; in response to inputting the source entity embedding and the target entity embedding into the decoder, outputting, by the decoder, the value. An example 3 includes the subject matter of example 2, further including obtaining the different link types from a taxonomy and creating the source entity embedding using at least two type-specific graph convolutional networks (GCNs) that each correspond to a different link type obtained from the taxonomy. An example 4 includes the subject matter of any of examples 1-3, further including creating the cross-lingual entity graph by extracting the plurality of source entities from data records stored in a source language, creating embedding links between the plurality of source entities and taxonomy entities obtained from a taxonomy, the plurality of links being links of different types between the taxonomy entities. An example 5 includes the subject matter of any of examples 1-4, further including creating the cross-lingual entity graph by extracting the plurality of target entities from data records stored in a target language, and creating embedding links between the plurality of target entities. An example 6 includes the subject matter of any of examples 1-5, each different link type indicating a different type of semantic relationship obtained from a taxonomy. An example 7 includes the subject matter of any of examples 1-6, the plurality of links being within language links (WLLs); the graph neural network having been trained using both WLLs and ground truth between language links (BLLs). An example 8 includes the subject matter of any of examples 1-7, further including extracting the source entity from a search query. An example 9 includes the subject matter of any of examples 1-8, further including extracting the source entity from a data record of a connections network-based system.

In an example 10, a machine translation system includes at least one processor; computer memory operably coupled to the at least one processor; means for configuring the computer memory according to a relational graph convolutional network (RGCN), the RGCN including a plurality of graph convolutional sub-networks trained using a cross-lingual entity graph; the cross-lingual entity graph including a first plurality of entities connected by a plurality of within language taxonomy links, a second plurality of entities connected by a plurality of within language embedding links, and a third plurality of entities connected by a plurality of between language links; the plurality of within language taxonomy links indicating at least two different link types obtained from a taxonomy; the plurality of within language embedding links indicating semantic similarities between connected entities; the plurality of between language links each indicating a valid machine translation.

An example 11 includes the subject matter of example 10, each graph convolutional sub-network trained using a different sub-graph of the cross-lingual entity graph. An example 12 includes the subject matter of example 11, each different sub-graph of the cross-lingual entity graph including a different particular link type of the at least two different link types obtained from the taxonomy. An example 13 includes the subject matter of any of examples 10-12, the RGCN further including an encoder configured to generate entity embeddings using the plurality of within language taxonomy links. An example 14 includes the subject matter of any of examples 10-13, the RGCN further including a decoder configured to compute alignment scores that indicate semantic alignment between the entity embeddings and other entity embeddings not computed using the plurality of within language taxonomy links.

In an example 15, a method for performing machine translation includes embedding a source entity in a cross-lingual entity graph stored in computer memory; identifying a target entity in the cross-lingual entity graph; the target entity being a valid translation of the source entity; the cross-lingual entity graph including a plurality of source entities, a plurality of target entities, a plurality of within language links that each indicate a different link type obtained from a taxonomy, and a plurality of between language links created using entity alignment scores computed by a graph convolutional network (GCN). An example 16 includes the subject matter of example 15, further including extracting the source entity from a search query. An example 17 includes the subject matter of example 15 or example 16, further including extracting the source entity from a data record of a connections network-based system. An example 18 includes the subject matter of any of examples 15-17, further including identifying the target entity by determining that a particular type of within language link (WLL) exists between the source entity and a taxonomy entity in the cross-lingual entity graph; and determining that a between language link (BLL) exists between the taxonomy entity and the target entity in the cross-lingual entity graph. An example 19 includes the subject matter of any of examples 15-18, further including identifying the target entity by iteratively computing alignment scores between the source entity and a plurality of different target entities in the cross-lingual entity graph. An example 20 includes the subject matter of any of examples 15-19, further including using the plurality of within language links to identify the target entity. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A method for performing machine translation, comprising:
   identifying an unlinked entity pair within a cross-lingual entity graph;
   the cross-lingual entity graph comprises a plurality of source entities, a plurality of target entities, and a plurality of links;
   at least two of the plurality of links comprise different link types;
   the unlinked entity pair comprises a source entity of the plurality of source entities and a target entity of the plurality of target entities;
   determining a sub-graph of the cross-lingual entity graph that includes the unlinked entity pair and at least one link of the plurality of links;
   inputting the sub-graph into a graph neural network (GNN) that has been trained using different link types;
   in response to inputting the sub-graph into the GNN, outputting, by the GNN, a value;
   determining that the value satisfies a criterion;
   creating and storing a link between the source entity and the target entity in the cross-lingual entity graph;
   the link indicates that the target entity is a valid translation of the source entity; and
   the cross-lingual entity graph is created by, before the sub-graph is input into the GNN, using taxonomy links to create a merged graph by merging a source language graph that does not comprise taxonomy links with a taxonomy graph and connecting the taxonomy graph with a target language graph.

2. The method of claim 1, further comprising:
   inputting the sub-graph into an encoder of the GNN;
   in response to inputting the sub-graph into the encoder, outputting, by the encoder, a source entity embedding;
   inputting the source entity embedding and a target entity embedding into a decoder of the GNN;
   in response to inputting the source entity embedding and the target entity embedding into the decoder, outputting, by the decoder, the value.

3. The method of claim 2, further comprising obtaining the different link types from a taxonomy and creating the source entity embedding using at least two type-specific graph convolutional networks (GCNs) that each correspond to a different link type obtained from the taxonomy.

4. The method of claim 1, further comprising creating the cross-lingual entity graph by extracting the plurality of source entities from data records stored in a source language, creating embedding links between the plurality of source entities and taxonomy entities obtained from a taxonomy, the plurality of links comprise links of different types between the taxonomy entities.

5. The method of claim 1, further comprising creating the cross-lingual entity graph by extracting the plurality of target entities from data records stored in a target language, and creating embedding links between the plurality of target entities.

6. The method of claim 1, each different link type indicating a different type of semantic relationship obtained from a taxonomy.

7. The method of claim 1, the plurality of links comprise within language links (WLLs); the graph neural network trained using both WLLs and ground truth between language links (BLLs).

8. The method of claim 1, further comprising extracting the source entity from a search query.

9. The method of claim 1, further comprising extracting the source entity from a data record of a connections network-based system.

10. A machine translation system, comprising:
    at least one processor; and
    computer memory operably coupled to the at least one processor;
    the computer memory comprises instructions that, when executed by the at least one processor, cause the at least one processor to:
    configure the computer memory according to a relational graph convolutional network (RGCN),
    the RGCN comprises a plurality of graph convolutional sub-networks trained using a cross-lingual entity graph;
    the cross-lingual entity graph comprises a first plurality of entities connected by a plurality of within language taxonomy links, a second plurality of entities connected by a plurality of within language embedding links, and a third plurality of entities connected by a plurality of between language links;

the plurality of within language taxonomy links indicate at least two different link types obtained from a taxonomy;

the plurality of within language embedding links indicate semantic similarities between connected entities;

the plurality of between language links each indicate a valid machine translation; and before the cross-lingual entity graph is used to train the plurality of graph convolutional sub-networks, the cross-lingual entity graph is created by (i) merging a source language semantic graph that does not comprise taxonomy links with the taxonomy and (ii) connecting the taxonomy to a target language graph.

11. The machine translation system of claim 10, each graph convolutional sub-network trained using a different sub-graph of the cross-lingual entity graph.

12. The machine translation system of claim 11, each different sub-graph of the cross-lingual entity graph comprising a different particular link type of the at least two different link types obtained from the taxonomy.

13. The machine translation system of claim 10, the RGCN further comprising an encoder configured to generate entity embeddings using the plurality of within language taxonomy links.

14. The machine translation system of claim 13, the RGCN further comprising a decoder configured to compute alignment scores that indicate semantic alignment between the entity embeddings and other entity embeddings not computed using the plurality of within language taxonomy links.

15. A method for performing machine translation, comprising:

embedding a source entity in a cross-lingual entity graph stored in computer memory;

identifying a target entity in the cross-lingual entity graph; the target entity comprises a valid translation of the source entity;

the cross-lingual entity graph comprises a plurality of source entities, a plurality of target entities, a plurality of within language links that each indicate a different link type obtained from a taxonomy, and a plurality of between language links created using entity alignment scores computed by a graph convolutional network (GCN); and the cross-lingual entity graph is created by (i) merging a source language semantic graph that does not comprise taxonomy links with the taxonomy and (ii) connecting the taxonomy with a target language graph.

16. The method of claim 15, further comprising extracting the source entity from a search query.

17. The method of claim 15, further comprising extracting the source entity from a data record of a connections network-based system.

18. The method of claim 15, further comprising identifying the target entity by determining that a particular type of within language link (WLL) exists between the source entity and a taxonomy entity in the cross-lingual entity graph; and determining that a between language link (BLL) exists between the taxonomy entity and the target entity in the cross-lingual entity graph.

19. The method of claim 15, further comprising identifying the target entity by iteratively computing alignment scores between the source entity and a plurality of different target entities in the cross-lingual entity graph.

20. The method of claim 15, further comprising using the plurality of within language links to identify the target entity.

* * * * *